US012802467B2

(12) United States Patent
Mizukoshi

(10) Patent No.: US 12,802,467 B2
(45) Date of Patent: Nov. 17, 2026

(54) STATE RECOGNITION APPARATUS, STATE RECOGNITION METHOD, COMPUTER-READABLE MEDIUM, TASK EXECUTION SYSTEM, AND TASK EXECUTION METHOD

(71) Applicant: NEC Corporation, Tokyo (JP)

(72) Inventor: Yasuhiro Mizukoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 19/118,108

(22) PCT Filed: Oct. 13, 2022

(86) PCT No.: PCT/JP2022/038173
§ 371 (c)(1),
(2) Date: Apr. 3, 2025

(87) PCT Pub. No.: WO2024/079841
PCT Pub. Date: Apr. 18, 2024

(65) Prior Publication Data

US 2026/0127896 A1 May 7, 2026

(51) Int. Cl.
*G06V 20/59* (2022.01)
*G06T 7/70* (2017.01)
*G06V 40/20* (2022.01)

(52) U.S. Cl.
CPC .............. *G06V 20/597* (2022.01); *G06T 7/70* (2017.01); *G06V 40/28* (2022.01)

(58) Field of Classification Search
CPC ........ G06V 20/597; G06V 40/28; G06T 7/70; B60K 28/06; B60W 40/08; B60W 2540/223; B60W 2540/26; B60W 2556/45; G06F 3/012; G08G 1/0141; G08G 1/0112; G08G 1/0133; G08G 1/04
See application file for complete search history.

(56) References Cited

U.S. PATENT DOCUMENTS

2014/0297059 A1* 10/2014 Mizutani ............... B60W 50/00 701/1
2015/0232033 A1* 8/2015 Bouaziz ............... G06V 20/597 701/49
2018/0176547 A1 6/2018 Kobayashi
2021/0023991 A1* 1/2021 Tannenbaum ....... G06V 20/597
2021/0213879 A1* 7/2021 Sedaghat Amoli ... G06F 3/0487

FOREIGN PATENT DOCUMENTS

JP 2009-009244 A 1/2009
JP 2018-101019 A 6/2018
JP 2019-193033 A 10/2019
JP 2020-184138 A 11/2020
JP 2022-152715 A 10/2022

OTHER PUBLICATIONS

International Search Report for PCT Application No. PCT/JP2022/038173, mailed on Dec. 13, 2022.
English translation of Written opinion for PCT Application No. PCT/JP2022/038173, mailed on Dec. 13, 2022.

* cited by examiner

*Primary Examiner* — Michael E Teitelbaum

(57) ABSTRACT

A state recognition apparatus detects that a mirror of a vehicle is operated. The state recognition apparatus determines a head position of a driver of the vehicle at a time point when the mirror is operated. The state recognition apparatus sets the determined head position as a reference position of a head in the vehicle.

15 Claims, 7 Drawing Sheets

STATE RECOGNITION APPARATUS, STATE RECOGNITION METHOD, COMPUTER-READABLE MEDIUM, TASK EXECUTION SYSTEM, AND TASK EXECUTION METHOD

This application is a National Stage Entry of PCT/JP2022/038173 filed on Oct. 13, 2022, the contents of all of which are incorporated herein by reference, in their entirety.

TECHNICAL FIELD

The present disclosure relates to a state recognition apparatus, a state recognition method, a computer-readable medium, a task execution system, and a task execution method.

BACKGROUND ART

A technique for detecting a state of a driver in a vehicle such as an automobile has been developed. For example, Patent Literature 1 discloses a technique for detecting that a driver is looking away by using, as a reference value, a direction of the face of a driver at time of adjusting an outer mirror.

CITATION LIST

Patent Literature

Patent Literature 1: Japanese Unexamined Patent Application Publication No. 2009-009244

SUMMARY OF INVENTION

Technical Problem

In Patent Literature 1, the direction of the face of the driver is used as a reference for the state of the driver. An objective of the present disclosure is to disclose a more efficient technique for determining a reference for a state of a driver.

Solution to Problem

According to the present disclosure, a state recognition apparatus includes: detection means for detecting that a mirror of a vehicle is operated; determining means for determining a head position of a driver of the vehicle at a time point when the operation is performed; and setting means for setting the determined head position as a reference position of a head in the vehicle.

According to the present disclosure, a state recognition method is executed by a computer. The state recognition method includes: a detection step of detecting that a mirror of a vehicle is operated; a determining step of determining a head position of a driver of the vehicle at a time point when the operation is performed; and a setting step of setting the determined head position as a reference position of a head in the vehicle.

According to the present disclosure, a program causes a computer to execute the state recognition method of the present disclosure.

Advantageous Effects of Invention

According to the present disclosure, a more efficient technique for determining a reference for a state of a driver is provided.

EXAMPLE EMBODIMENT

Figure 1:
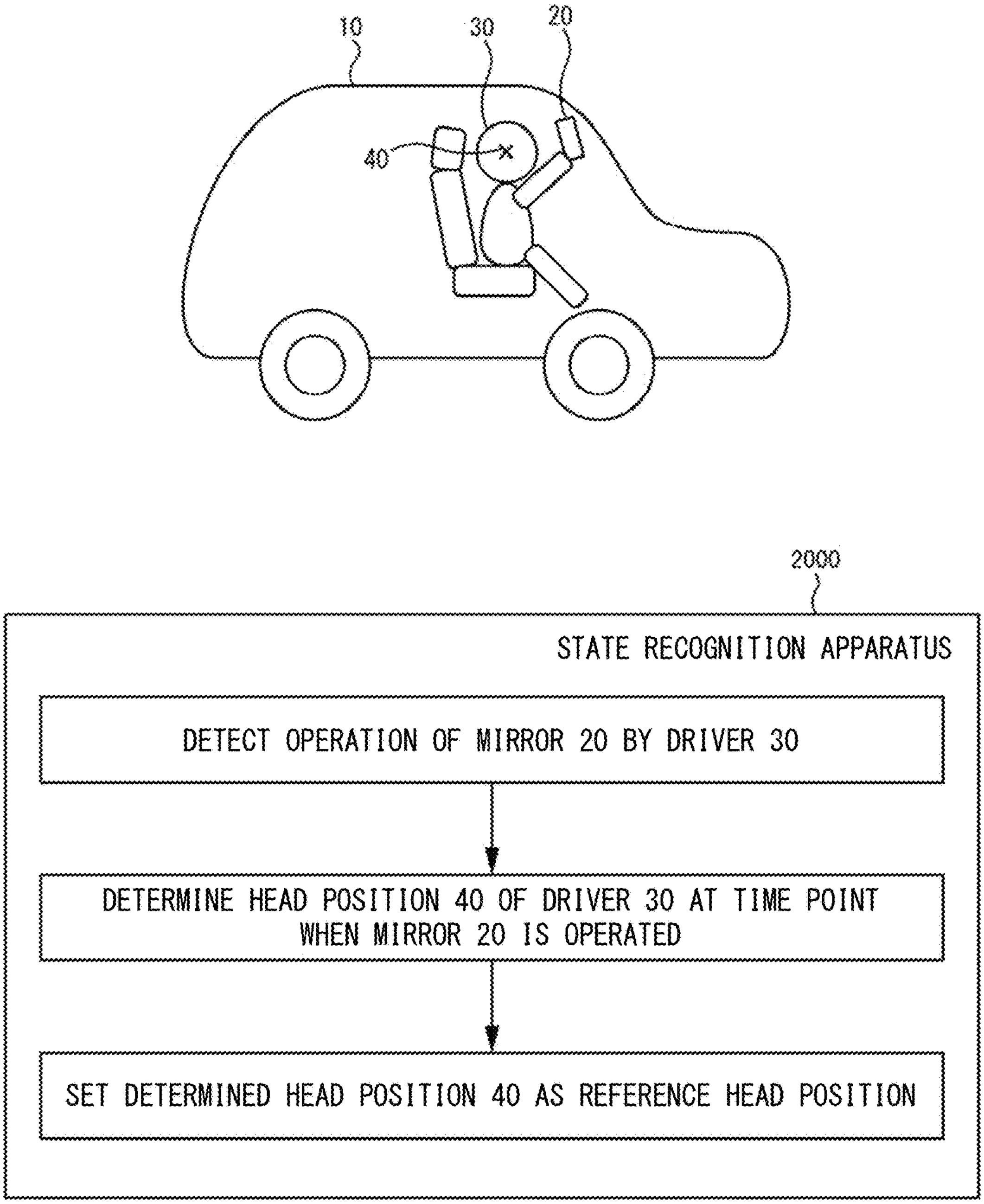
FIG. 1 is a diagram illustrating an overview of an operation of a state recognition apparatus according to an example embodiment.

Hereinafter, example embodiments of the present disclosure will be described in detail with reference to the drawings. In the drawings, the same or corresponding elements are denoted by the same reference numerals, and repeated description is omitted as necessary for clarity of description. In addition, unless otherwise described, predetermined values such as predetermined values and threshold values are stored in advance in a storage device or the like accessible from an apparatus using the values. Furthermore, unless otherwise described, a storage unit includes one or any larger number of storage devices.

<Overview>

FIG. 1 is a diagram illustrating an overview of a state recognition apparatus 2000 according to an example embodiment. Here, FIG. 1 is a diagram for facilitating understanding of the overview of the state recognition apparatus 2000, and the operation of the state recognition apparatus 2000 is not limited to that illustrated in FIG. 1.

The state recognition apparatus 2000 sets the position of a driver 30 at a time point when a mirror 20 provided in a vehicle 10 is operated, as a reference position of the head (hereinafter, referred to as reference head position) in the vehicle 10. The vehicle 10 is, for example, an automobile. The mirror 20 is a mirror used by the driver 30 during driving, and is, for example, a rear-view mirror or a side mirror.

Note that only one type of mirror may be treated as the mirror 20, or a plurality of types of mirrors may be treated as the mirror 20. In the latter case, for example, if any one of the rear-view mirror and two side mirrors is operated, the state recognition apparatus 2000 determines that the mirror 20 is operated by the driver 30.

For example, the state recognition apparatus 2000 operates as follows. First, the state recognition apparatus 2000 detects an operation of the mirror 20 by the driver 30. Further, the state recognition apparatus 2000 determines the position (head position 40) of the head of the driver 30 at the time point when the mirror 20 is operated by the driver 30.

Then, the state recognition apparatus 2000 sets the determined head position 40 as a reference head position in the vehicle 10.

Note that, although the head position 40 is represented by one point in FIG. 1, the head position 40 may be represented by a combination of a plurality of points. Details regarding how to represent the head position 40 will be described later.

<Example of Advantageous Effect>

According to the state recognition apparatus 2000, in response to the detection of the operation of the mirror 20 by the driver 30, the head position of the driver 30 at the time of the operation is set as the reference head position. As described above, according to the state recognition apparatus 2000, a new technique for determining a reference of the state of the driver of the vehicle is provided.

Here, it is considered that the position of the head of the driver 30 at the time of the mirror 20 being operated is close to the position of the head at the time of the driver 30 looking ahead of the vehicle 10. Therefore, according to the state recognition apparatus 2000, it is possible to easily set the position of the head of the driver 30 in a state close to a state of looking ahead, as the reference position of the head.

Hereinafter, the state recognition apparatus 2000 in the present example embodiment will be described in more detail.

<Example of Functional Configuration>

Figure 2:
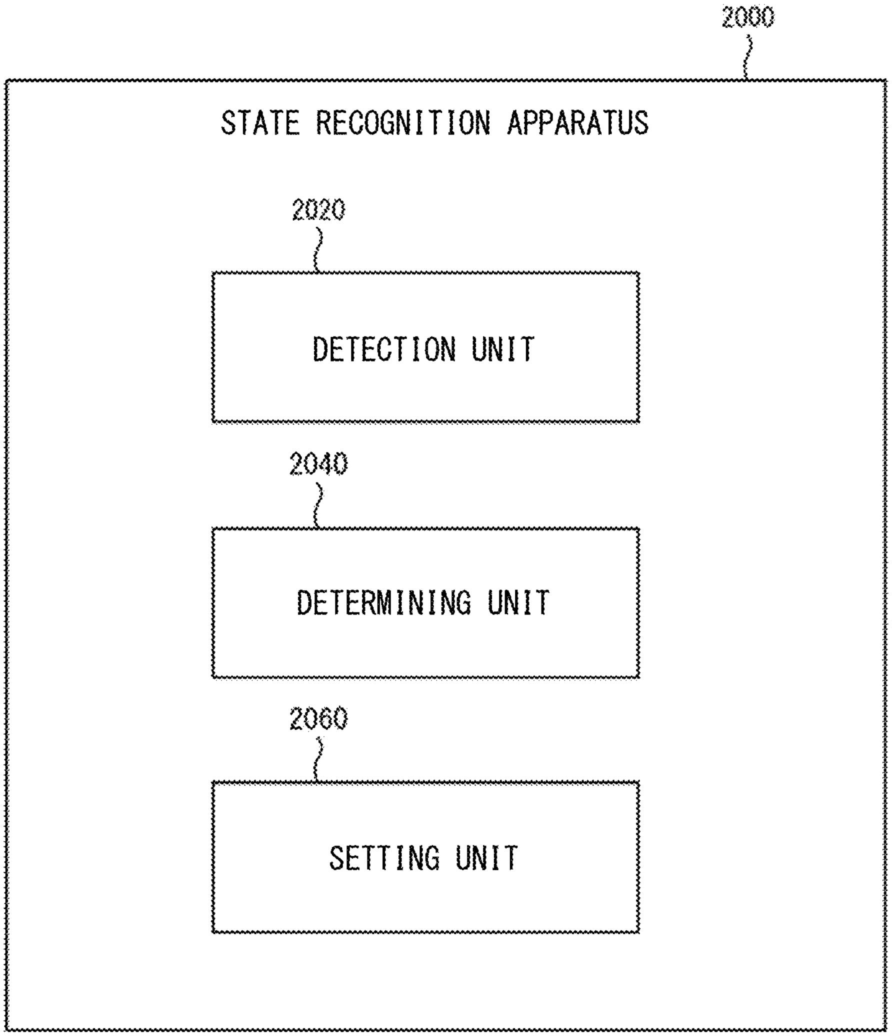
FIG. 2 is a block diagram illustrating a functional configuration of the state recognition apparatus.

FIG. 2 is a block diagram illustrating a functional configuration of the state recognition apparatus 2000 in the example embodiment. The state recognition apparatus 2000 includes a detection unit 2020, a determining unit 2040, and a setting unit 2060. The detection unit 2020 detects an operation of the mirror 20 by the driver 30. The determining unit 2040 determines the head position 40 at a time point when the mirror 20 is operated by the driver 30. The setting unit 2060 sets the determined head position 40 as a reference head position in the vehicle 10.

<Example of Hardware Configuration>

Each functional configuration unit of the state recognition apparatus 2000 may be implemented by hardware (for example, a hard-wired electronic circuit or the like) that implements each functional configuration unit, or may be implemented by a combination of hardware and software (for example, a combination of an electronic circuit and a program that controls the electronic circuit or the like). Hereinafter, a case where each functional configuration unit of the state recognition apparatus 2000 is realized by a combination of hardware and software will be further described.

Figure 3:
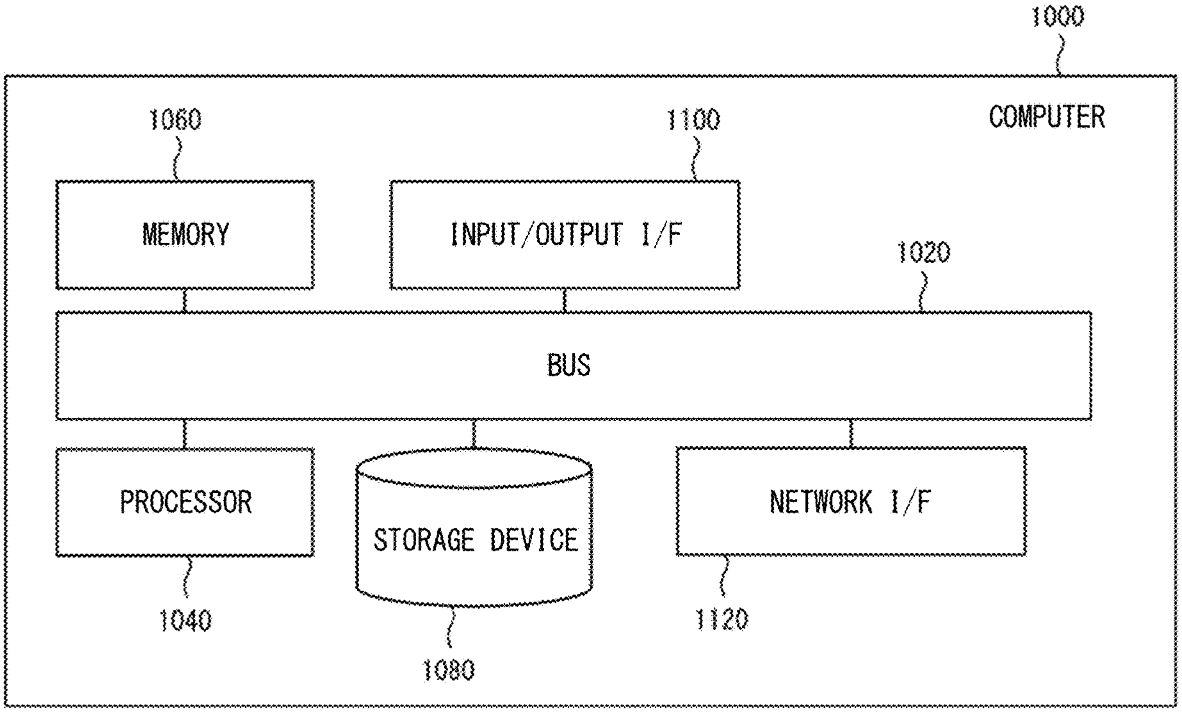
FIG. 3 is a block diagram illustrating a hardware configuration of a computer that implements the state recognition apparatus.

FIG. 3 is a block diagram illustrating a hardware configuration of a computer 1000 that implements the state recognition apparatus 2000. The computer 1000 is any computer. For example, the computer 1000 is an electronic control unit (ECU), a navigation device, a tablet terminal, or the like provided inside the vehicle 10. In another example, the computer 1000 is a personal computer (PC) or a server machine provided outside the vehicle 10. The computer 1000 may be a dedicated computer designed to realize the state recognition apparatus 2000, or may be a general-purpose computer.

For example, when a predetermined application is installed in the computer 1000, each function of the state recognition apparatus 2000 is realized in the computer 1000. The above-described application is configured with a program for implementing the functional configuration units of the state recognition apparatus 2000. Note that the method of acquiring the program is arbitrary. For example, the program can be acquired from a storage medium (a DVD disk, a USB memory, or the like) in which the program is stored. The program can also be acquired, for example, by downloading the program from a server device that manages the storage device in which the program is stored.

The computer 1000 includes a bus 1020, a processor 1040, a memory 1060, a storage device 1080, an input/output interface 1100, and a network interface 1120. The bus 1020 is a data transmission path for the processor 1040, the memory 1060, the storage device 1080, the input/output interface 1100, and the network interface 1120 to transmit and receive data to and from each other. However, the method of connecting the processor 1040 and the like to each other is not limited to the bus connection.

The processor 1040 is any of processors such as a central processing unit (CPU), a graphics processing unit (GPU), a field-programmable gate array (FPGA), or a digital signal processor (DSP). The memory 1060 is a primary storage device realized by using a random access memory (RAM) or the like. The storage device 1080 is an auxiliary storage device realized using a hard disk, a solid state drive (SSD), a memory card, a read only memory (ROM), or the like.

The input/output interface 1100 is an interface connecting the computer 1000 with an input/output device. For example, an input device such as a keyboard and an output device such as a display device are connected to the input/output interface 1100.

The network interface 1120 is an interface connecting the computer 1000 to a network. The network may be a local area network (LAN) or a wide area network (WAN).

The storage device 1080 stores a program (program for realizing the above-described application) for realizing each functional configuration unit of the state recognition apparatus 2000. The processor 1040 realizes each functional configuration unit of the state recognition apparatus 2000 by reading and executing this program in the memory 1060.

The state recognition apparatus 2000 may be implemented by one computer 1000 or may be implemented by a plurality of computers 1000. In the latter case, the configurations of the computers 1000 do not need to be the same, and can be different from each other.

<Flow of Processing>

Figure 4:
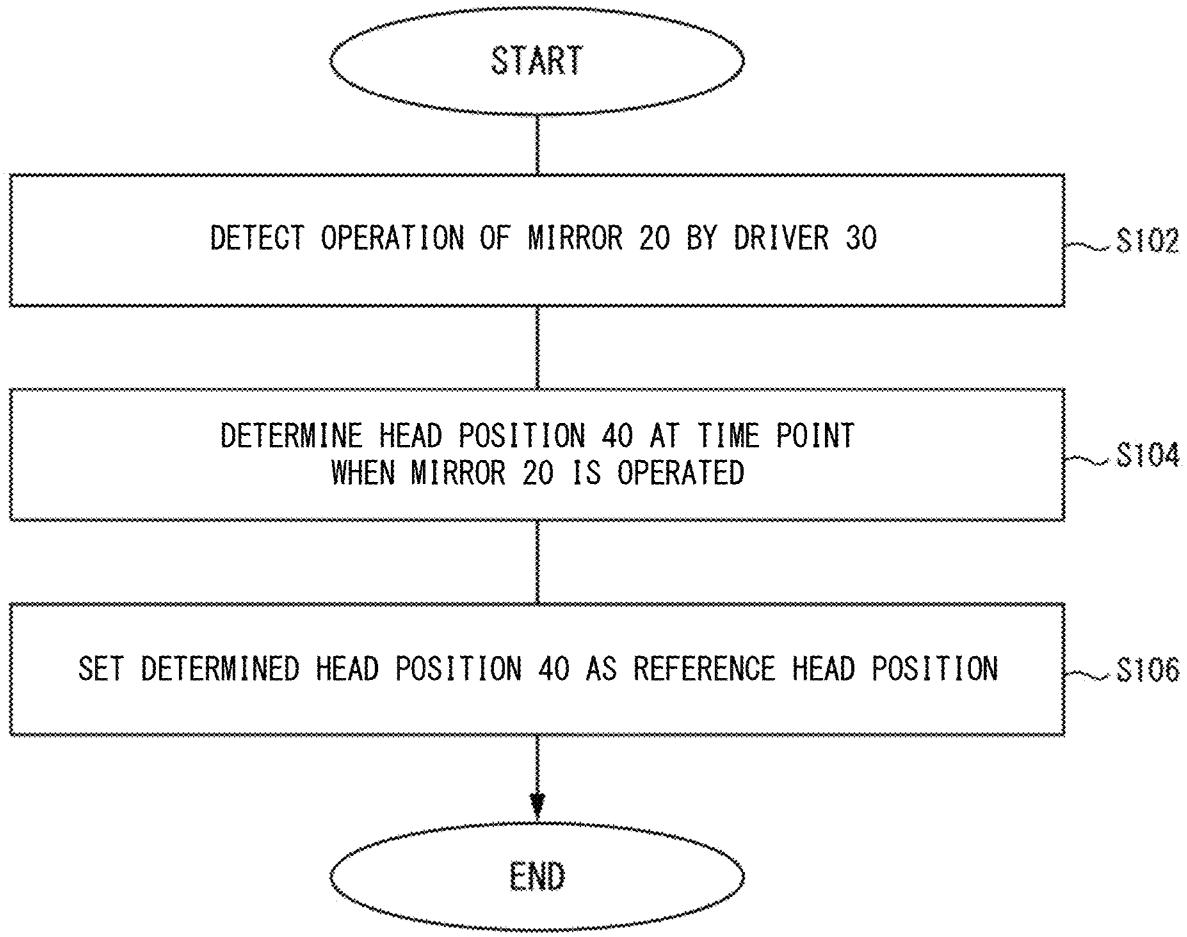
FIG. 4 is a flowchart illustrating a flow of processing executed by the state recognition apparatus.

FIG. 4 is a flowchart illustrating a flow of processing performed by the state recognition apparatus 2000 in the example embodiment. The detection unit 2020 detects the operation of the mirror 20 by the driver 30 (S102). The determining unit 2040 determines the head position 40 at a time point when the mirror 20 is operated by the driver 30 (S104). The setting unit 2060 sets the determined head position 40 as the reference head position (S106).

<Detection of Operation of Mirror 20: S102>

The detection unit 2020 detects the operation of the mirror 20 by the driver 30 (S102). Hereinafter, some specific methods will be exemplified.

<<Example 1 of Detection Method>>

For example, the detection unit 2020 detects a specific operation being performed on an operation interface of the mirror 20 provided in the vehicle 10, thereby detecting the operation of the mirror 20. In this case, the detection unit 2020 determines a time point when the specific operation is performed as a time point when the mirror 20 is operated by the driver 30.

The operation interface of the mirror 20 may be a mechanical interface or a software interface. In the former case, the operation interface of the mirror 20 is a mechanical switch (a button, a lever, or the like) or the like. In this case, the detection unit 2020 detects that the mirror 20 is operated by detecting a specific operation being performed on a specific mechanical switch.

In the case where the operation interface of the mirror 20 is a software interface, the operation interface is, for example, a software interface (a button, a slider, or the like) displayed on a touch panel or the like provided in the vehicle 10. In this case, the detection unit 2020 detects that the mirror 20 is operated by detecting a specific operation being performed on a specific software interface.

Note that a well-known technique can be used as a technique for detecting a specific operation being performed on a specific mechanical interface or software interface.

<<Example 2 of Detection Method>>

For example, the detection unit 2020 analyzes time-series data of captured images (hereinafter, referred to as image sequence) including the mirror 20 and the driver 30, thereby detecting the operation of the mirror 20. In this case, the vehicle 10 is provided with a camera (hereinafter, referred to as first camera) whose image capturing range includes the mirror 20 and the vicinity thereof. The first camera generates an image sequence by repeatedly performing image capturing. This image sequence is referred to as a first image sequence below.

For example, the detection unit 2020 determines whether or not an action of moving the mirror 20 is included for each captured image included in the first image sequence. If it is determined that the action of moving mirror 20 is included in a certain captured image, the detection unit 2020 detects that the mirror 20 is operated by the driver 30. In this case, the detection unit 2020 determines a generation time point of the captured image as a time point when the mirror 20 is operated by the driver 30.

In order to implement the above determination, for example, there is a predetermined definition of a condition (hereinafter, referred to as first predetermined condition) for determining that "an action of moving the mirror 20 by hand is included in the captured image". In this case, the detection unit 2020 determines whether or not the first predetermined condition is satisfied for each captured image. If the first predetermined condition is satisfied by a certain captured image, the detection unit 2020 determines that the captured image includes the action of moving mirror 20 by hand. As the first predetermined condition, for example, a condition that "the mirror 20 is touched by the driver 30" or "the mirror 20 is held by the driver 30" can be adopted.

For example, in the case where the first predetermined condition is satisfied in one captured image of the first image sequence, the detection unit 2020 determines that the mirror 20 is operated by the driver 30. In another example, in the case where the first predetermined condition is satisfied in each of a plurality of captured images included in a predetermined time in the first image sequence, the detection unit 2020 determines that the mirror 20 is operated by the driver 30. In the latter case, the detection unit 2020 may determine that the mirror 20 is operated by the driver 30 if the first predetermined condition is satisfied in each of all captured images included in the predetermined time, or may determine that the mirror 20 is operated by the driver 30 if the first predetermined condition is satisfied in each of a predetermined ratio or more or a predetermined number or more of the captured images included in the predetermined time.

A specific method for determining whether or not the above-described first predetermined condition is satisfied is arbitrary. For example, the detection unit 2020 performs object recognition processing on the captured image to detect an image area (hereinafter, referred to as mirror area) representing the mirror 20 and an image area (hereinafter, referred to as hand area) representing the hand of the driver 30. If the mirror area and the hand area are in contact with each other or if the mirror area and the hand area overlap each other, the detection unit 2020 determines that the first predetermined condition is satisfied.

The first predetermined condition may be a condition related to a positional relationship between a joint point of the hand of the driver 30 and the mirror 20. In this case, the detection unit 2020 detects the joint points of the hand of the driver 30 from the captured image, and determines whether or not the positional relationship between the joint point of the hand of the driver 30 and the mirror 20 satisfies the first predetermined condition, thereby detecting the operation of the mirror 20 by the driver 30. As the joint points of the hand of the driver 30, for example, joint points of respective fingers of the hand and joint points of the wrist are detected.

More specifically, as the first predetermined condition, a condition that "a distance between the joint point of the hand of the driver 30 and the mirror area is equal to or less than a threshold" can be adopted. In this case, the detection unit 2020 detects the joint points of the hand of the driver 30 and the mirror area for each captured image included in the first image sequence. The detection unit 2020 further determines whether or not the distance between the joint points of the hand of the driver 30 and the mirror area is less than or equal to the threshold. If it is determined that the distance between the joint point of the hand of the driver 30 and the mirror area is equal to or less than the threshold for a certain captured image, the detection unit 2020 determines that the mirror 20 is operated by the driver 30 at the time point when the captured image is generated.

Note that if a plurality of joint points of the hand of the driver 30 are detected, the detection unit 2020 calculates the distance to the mirror area for each of the plurality of joint points. For example, the detection unit 2020 determines that the driver 30 operates the mirror 20 when at least one of a plurality of calculated distances is less than or equal to the threshold.

<<Example 3 of Detection Method>>

For example, the detection unit 2020 analyzes an operation interface of the mirror 20 and an image sequence including the driver 30 (hereinafter, referred to as second image sequence), thereby detecting that the mirror 20 is operated. In this case, a camera (hereinafter, referred to as second camera) whose image capturing range includes the operation interface of the mirror 20 and the vicinity thereof is provided in the vehicle 10. The detection unit 2020 acquires and analyzes an image sequence generated by the second camera.

For example, the detection unit 2020 determines whether or not each captured image included in the second image sequence includes an action of operating the operation interface of the mirror 20. If a certain captured image includes the action of operating the operation interface of the mirror 20, the detection unit 2020 determines that the mirror 20 is operated at the generation time point of the captured image.

Here, as a method for determining "whether or not the action of operating the operation interface of the mirror 20 is included", a method similar to the above-described method for determining "whether or not the action of moving the mirror 20 by hand is included" can be adopted. Specifically, for each captured image included in the second image sequence, a method for determining whether or not a condition (hereinafter, referred to as second predetermined condition) such as "the operation interface of the mirror 20 is touched by the driver 30" or "the distance between the joint point of the hand of the driver 30 and the operation interface of the mirror 20 is equal to or less than the threshold" is satisfied can be adopted. If the captured image satisfying the second predetermined condition is detected, the detection unit 2020 determines that the mirror 20 is operated by the driver 30 at the generation time point of the captured image.

Here, the detection unit 2020 may determine that the driver 30 operates the mirror 20 if the second predetermined condition is satisfied in one of captured images in the second image sequence, or may determine that the driver 30 operates the mirror 20 if the second predetermined condition is satisfied in each of a plurality of captured images included in a predetermined time in the second image sequence. In addition, in the latter case, the detection unit 2020 may determine that the mirror 20 is operated by the driver 30 if the second predetermined condition is satisfied in each of all captured images included in the predetermined time, or may determine that the mirror 20 is operated by the driver 30 if the second predetermined condition is satisfied in each of a predetermined ratio or more or a predetermined number or more of the captured images included in the predetermined time.

<Determining of Head Position 40: S104>

The determining unit 2040 determines the head position 40 at a time point when the mirror 20 is operated by the driver 30 (S104). Here, various methods for determining the time point when the mirror 20 is operated by the driver 30 are as described above.

For example, the head position 40 is represented by coordinates of one or more points. In the case where the position of the head is represented by coordinates of one point, for example, the head position 40 is represented by coordinates of a point representing a specific position of the head. The specific position of the head is, for example, the center of the head. In another example, the specific position of the head may be the center of a point representing each of a plurality of parts (both eyes, nose, and the like) of the head.

Figure 5:
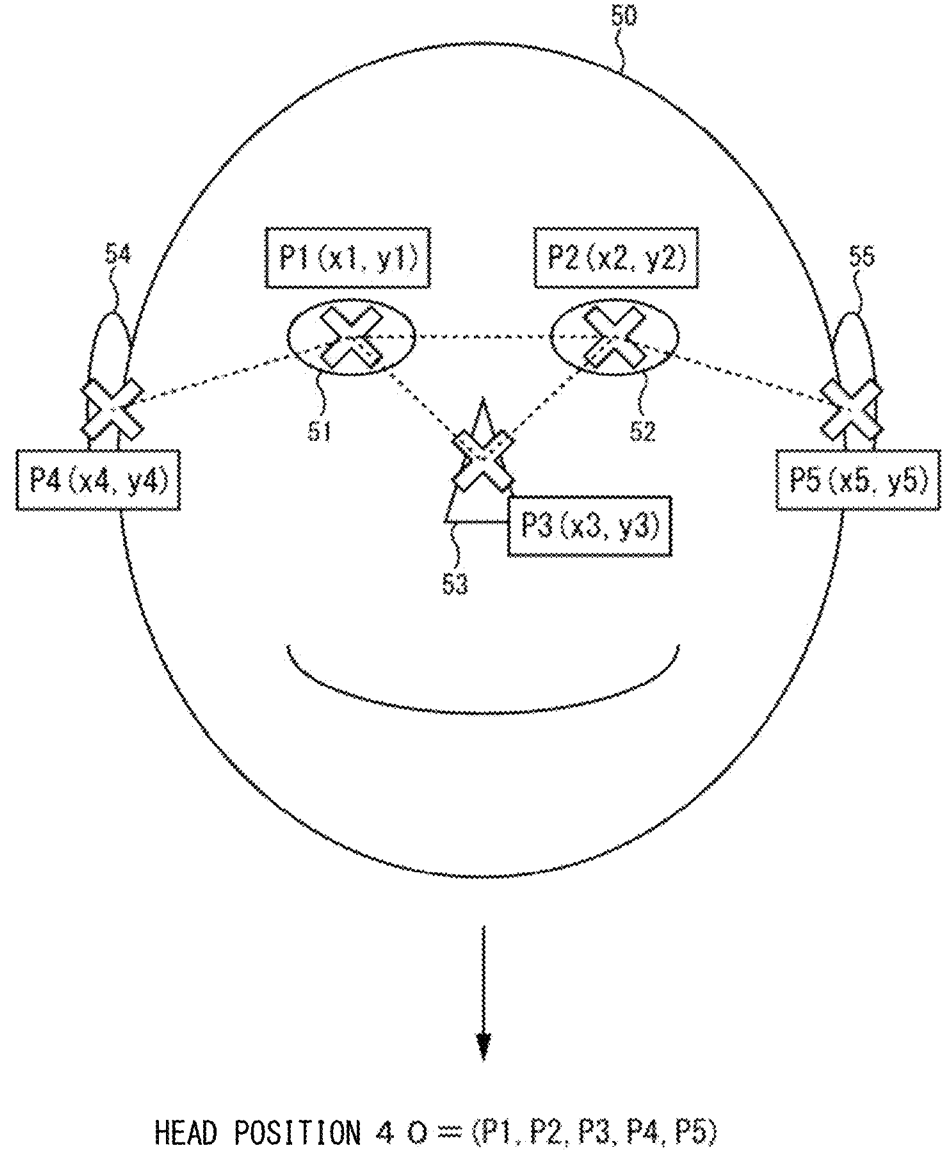
FIG. 5 is a diagram illustrating a case where a head position is represented by a combination of coordinates of a plurality of points.

In the case where the head position 40 is represented by coordinates of a plurality of points, for example, the head position 40 is represented by a combination of coordinates of points representing each of a plurality of parts of the head. FIG. 5 is a diagram illustrating a case where the head position 40 is represented by a combination of coordinates of a plurality of points. In this example, the head position 40 is represented by a combination of coordinates P1 of the right eye 51, coordinates P2 of the left eye 52, coordinates P3 of the nose 53, coordinates P4 of the right ear 54, and coordinates P5 of the left ear 55 included in the head 50. Note that the head position 40 may be represented by a combination of coordinates of any two or more of the plurality of specific parts.

For example, a captured image including the head of the driver 30 and the vicinity thereof is used to determine the head position 40. In this case, a camera (hereinafter, referred to as third camera) whose image capturing range includes the head of the driver 30 is provided in the vehicle 10.

For example, the determining unit 2040 determines the captured image at the generation time point closest to a time point when the mirror 20 is operated, from among captured images generated by the third camera. Then, the determining unit 2040 determines the head position 40 by analyzing the determined captured image. In another example, the determining unit 2040 may cause the third camera to perform image capturing in response to detection of the operation of the mirror 20 by the driver 30, and analyze the captured image generated as a result of the image capturing.

A method for determining the head position 40 by analyzing the captured image will be described below. For example, the determining unit 2040 detects an image area representing the human head (hereinafter, referred to as head area) from the captured image. Then, the determining unit 2040 determines coordinates of a specific position (for example, the center position of the head area) of the head area as the head position 40.

In another example, the determining unit 2040 detects a specific part of a person such as an eye or a nose from the captured image. Then, the determining unit 2040 determines a combination of coordinates of each specific part as the head position 40. In addition, the determining unit 2040 may calculate coordinates of a specific point such as a center position from coordinates of a plurality of specific parts and determine the calculated coordinates as the head position 40.

Here, the position of the head of the driver 30 may be represented by two-dimensional coordinates on the captured image or may be represented by three-dimensional coordinates on a virtual three-dimensional space. In the latter case, the determining unit 2040 converts the two-dimensional coordinates on the captured image acquired from the third camera into three-dimensional coordinates in a predetermined virtual three-dimensional space. Here, a well-known technique can be used as a technique for converting two-dimensional coordinates on an image into three-dimensional coordinates in a specific virtual three-dimensional space.

Here, a plurality of captured images obtained by capturing the head of the driver 30 from different directions may be used to calculate the coordinates in the virtual three-dimensional space. In this case, the vehicle 10 is provided with a plurality of third cameras.

<Setting of Reference Head Position: S106>

The setting unit 2060 sets the determined head position 40 as the reference head position (S106). For example, the setting unit 2060 sets the reference head position by generating information (reference information below) indicating the reference head position and outputting the generated reference information in a predetermined manner. The reference information is output in a manner that is available to an apparatus using the reference information (hereinafter, referred to as application apparatus). The application apparatus may be provided inside the vehicle 10 or may be provided outside the vehicle 10. Note that the application apparatus may be provided integrally with the state recognition apparatus 2000 (that is, the state recognition apparatus 2000 may further have a function of operating as the application apparatus), or may be provided separately from the state recognition apparatus 2000.

A method for outputting the reference information is arbitrary. For example, the setting unit 2060 stores the reference information in a storage unit accessible from the application apparatus. In another example, the setting unit 2060 transmits the reference information to the application apparatus.

The setting unit 2060 may determine the posture of the head of the driver 30 by using the head position 40 and include the determined posture of the head in the reference information as a reference posture of the head (hereinafter, referred to as reference head posture). The posture of the head is represented by, for example, a rotation angle for each of three-dimensional axes (pitch, roll, and yaw). In the case where the posture of the head is calculated in this manner, the head position 40 is represented by a combination of two or more coordinates. Here, a well-known technique can be used as a specific method for calculating the posture of the object from the coordinates of a plurality of parts of the object.

The setting unit 2060 may determine identification information of the driver 30, and include the determined identification information in the reference information. By including the identification information of the driver 30 in the reference information in this manner, the reference head position can be set for each person in a case where the vehicle 10 is shared by a plurality of persons.

The driver 30 is identified by using, for example, a feature value obtained from the image of the face of the driver 30 (hereinafter, referred to as face feature value). For example, the setting unit 2060 uses the face feature value of the driver 30 as the identification information of the driver 30. In this case, at the time when generating the reference information, the setting unit 2060 acquires the captured image including the face of the driver 30. Then, the setting unit 2060 determines the face feature value of the driver 30 by analyzing the acquired captured image, and includes the determined face feature value in the reference information.

In another example, the setting unit 2060 may use an identification character string assigned to the driver 30 in advance as the identification information of the driver 30. In this case, for each person who is likely to drive the vehicle 10, a storage unit accessible from the setting unit 2060 stores in advance person information in which the identification character string of the person is associated with the face feature value. At the time when generating the reference information, the setting unit 2060 determines the person information including the face feature value matching the face feature value of the driver 30. Then, the setting unit 2060 includes the identification character string included in the determined person information in the reference information as the identification information of the driver 30.

Here, in order to be able to acquire a captured image including the face of the driver 30, it is assumed that the vehicle 10 is provided with a camera whose image capturing range includes the face of the driver 30. However, as the captured image including the face of the driver 30, a captured image generated by the third camera (captured image including the head of the driver 30) may be used.

<Update of Reference Information>

In the case where the vehicle 10 is repeatedly used, the state recognition apparatus 2000 may repeatedly generate the reference information. For example, the state recognition apparatus 2000 generates the reference information every time the vehicle 10 is turned on. In this case, the state recognition apparatus 2000 updates the reference information output in the past by outputting the newly generated reference information. The application apparatus uses the newly output reference information instead of the reference information output in the past.

Note that in the case where the reference information is generated for each person, the state recognition apparatus 2000 updates the reference information generated in the past for the current driver 30 with the newly generated reference information for the driver 30.

<Use of Default Head Position>

In the case where the operation of the mirror 20 by the driver 30 is not detected, the state recognition apparatus 2000 may generate the reference information in which the default head position is indicated as the reference head position. For example, the state recognition apparatus 2000 detects an operation of the mirror 20 by the driver 30 within a predetermined period. If the mirror operation of the mirror 20 by the driver 30 is detected within the predetermined period, the state recognition apparatus 2000 sets head position 40 determined by the above-described various methods as the reference head position. On the other hand, if the mirror operation of the mirror 20 by the driver 30 is not detected within the predetermined period, the state recognition apparatus 2000 sets the default head position as the reference head position.

The predetermined period is, for example, a period of a predetermined time length starting from the startup time point of the vehicle 10. As the starting time point of the vehicle 10, a time point when the engine of the vehicle 10 is turned on, a time point when the power of the vehicle 10 is turned on, or the like can be adopted. In another example, the predetermined period may be the period from the starting time point of the vehicle 10 to the time point when the vehicle 10 starts moving.

For example, the reference head position indicated by the latest reference information is used as the default head position. As a result, the same position as the reference head position at the previous riding is set as the reference head position. In another example, a head position manually set in advance by an administrator may be used as the default head position.

In the case where the reference head position is set for each person, the state recognition apparatus 2000 uses the reference head position indicated in the reference information generated most recently for the driver 30 as the default head position. If the reference information has not been generated for the driver 30 in the past, for example, the state recognition apparatus 2000 uses the default head position manually set by the administrator.

Note that when the reference information includes the reference head posture, the default value is also used for the reference head posture similarly to the reference head position.

<Example of Application Apparatus>

Figure 6:
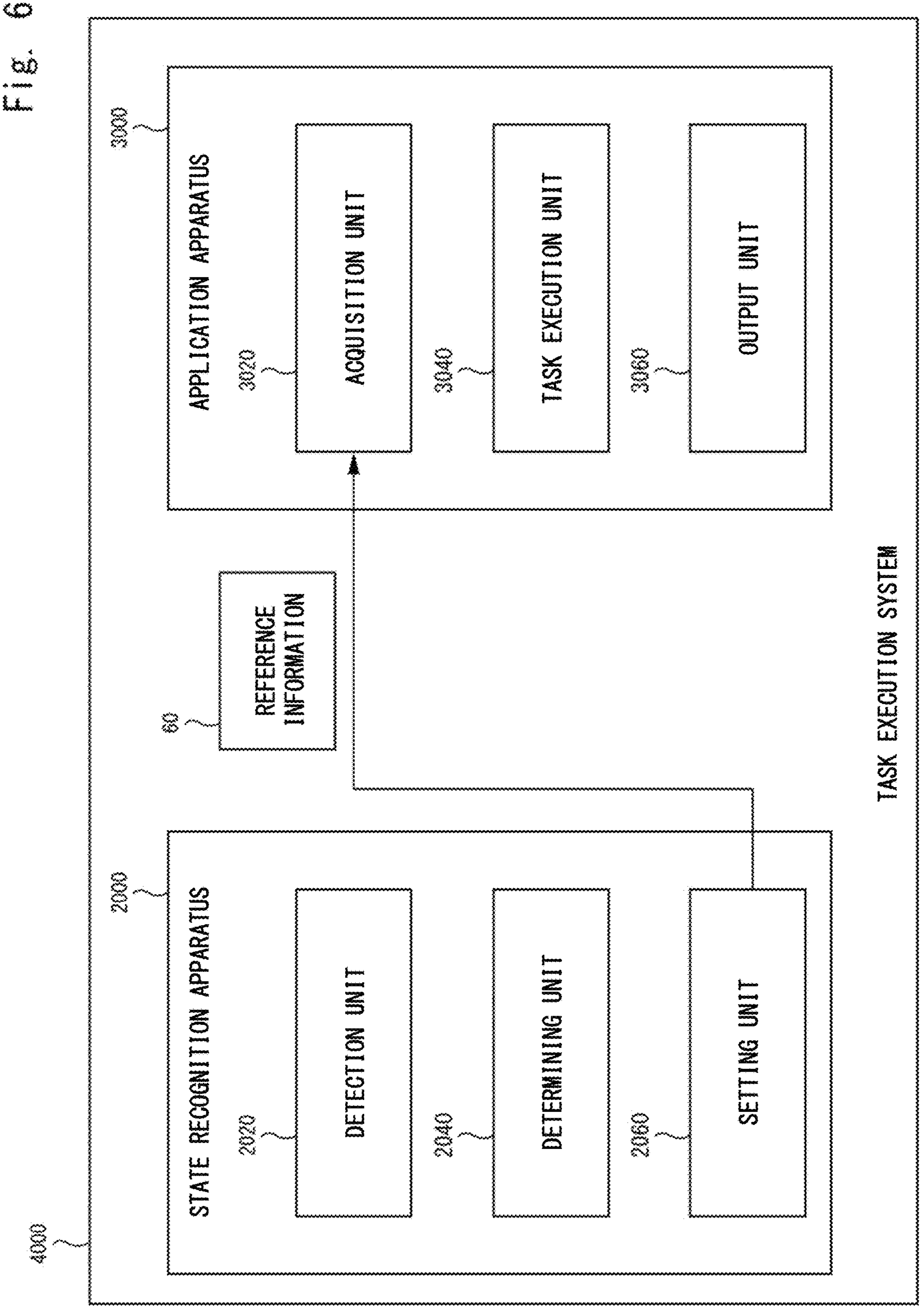
FIG. 6 is a block diagram illustrating a functional configuration of a system including the state recognition apparatus and an application apparatus.

The application apparatus is an apparatus that executes a predetermined task by using the reference information. FIG. 6 is a diagram illustrating a task execution system 4000 including the state recognition apparatus 2000 and an application apparatus 3000.

The application apparatus 3000 includes an acquisition unit 3020, a task execution unit 3040, and an output unit 3060. The acquisition unit 3020 acquires reference information 60 output by the state recognition apparatus 2000. The task execution unit 3040 executes a task by using the reference information 60. The output unit 3060 outputs output information indicating the execution result of the task.

The task executed by the task execution unit 3040 is arbitrary. For example, the task executed by the task execution unit 3040 is monitoring the state of the driver 30. In this case, for example, the task execution unit 3040 periodically compares the current head position of the driver 30 with the reference head position indicated by the reference information 60. More specifically, the task execution unit 3040 determines whether or not a deviation degree between the current head position of the driver 30 and the reference head position satisfies a predetermined condition. When the deviation degree between the current head position of the driver 30 and the reference head position satisfies a predetermined condition, the task execution unit 3040 determines that the state of the driver 30 is abnormal.

When the reference head posture is further included in the reference information 60, the task execution unit 3040 also compares the current head posture of the driver 30 with the reference head posture. That is, the task execution unit 3040 determines whether or not a predetermined condition is satisfied for a deviation degree between the current head position of the driver 30 and the reference head position and a deviation degree between the current head posture of the driver 30 and the reference head posture.

The deviation degree between the current head position and the reference head position is represented by, for example, a distance between the current head position and the reference head position, or each of differences in the x coordinate, the y coordinate, and the z coordinate between the current head position and the reference head position. In addition, the deviation degree between the current head posture and the reference head posture is represented by a difference in yaw, a difference in pitch, a difference in roll, and the like.

When it is determined that the state of the driver 30 is abnormal, the output unit 3060 outputs output information notifying that the state of the driver 30 is abnormal. For example, the output information is information indicating a notification to the driver 30. In this case, the output information is a predetermined message displayed on a display device provided in the vehicle 10 or a predetermined voice output from a speaker provided in the vehicle 10. In another example, the output information may be information indicating a notification (such as an emergency call) to the outside of the vehicle 10.

Similarly to the hardware configuration of the state recognition apparatus 2000, the hardware configuration of the application apparatus 3000 is illustrated in FIG. 3, for example. However, a storage device of the application apparatus 3000 stores a program for implementing each functional configuration unit of the application apparatus 3000.

Figure 7:
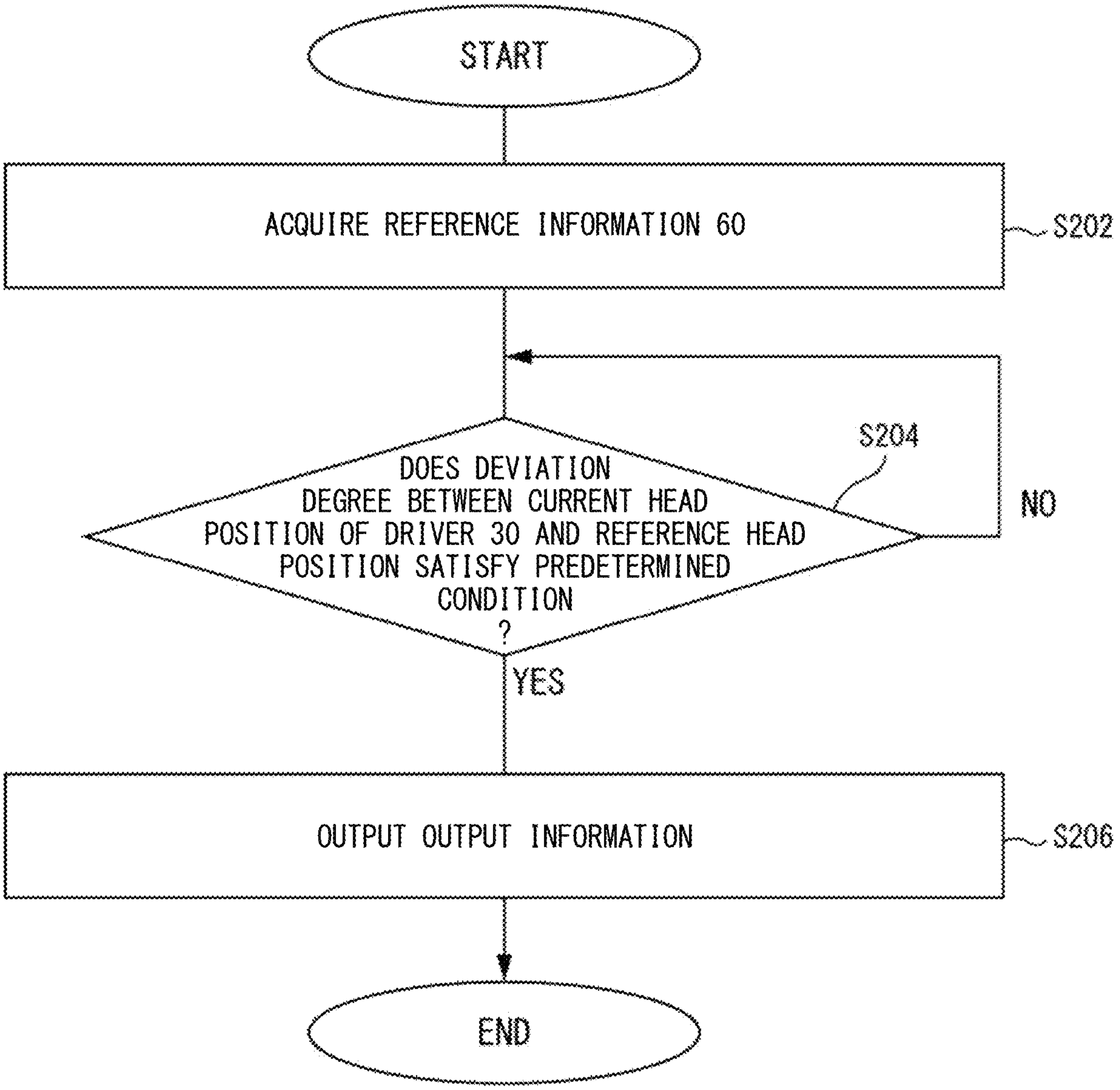
FIG. 7 is a flowchart illustrating a flow of processing executed by the application apparatus.

FIG. 7 is a flowchart illustrating a flow of processing executed by the application apparatus 3000. The acquisition unit 3020 acquires the reference information 60 (S202). The task execution unit 3040 determines whether or not the deviation degree between the current head position of the driver 30 and the reference head position satisfies a predetermined condition (S204). When the deviation degree does not satisfy the predetermined condition (S204: NO), the task execution unit 3040 executes S204 again. Note that a predetermined standby time may be provided until the next execution of S204.

When the deviation degree between the current head position of the driver 30 and the reference head position satisfies the predetermined condition (S204: YES), the output unit 3060 outputs output information (S206). As described above, in the case where the reference head posture is included in the reference information, the task execution unit 3040 compares the current head posture of the driver 30 with the reference head posture in addition to the comparison between the current head position of the driver 30 and the reference head position.

The output information output by the output unit 3060 is not limited to the notification indicating that the state of the driver 30 is abnormal. For example, if the deviation degree between the current head position of the driver 30 and the reference head position satisfies a predetermined condition (that is, if the state of the driver 30 is abnormal), the output unit 3060 may output a control signal for safely stopping the vehicle 10 as the output information. As a result, for example, if the state of the driver 30 is abnormal, it is possible to perform control such as stopping the vehicle 10 on the road shoulder.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. And each embodiment can be appropriately combined with at least one of embodiments.

In the above-described example, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Some or all of the above-described example embodiments may be described as in the following Supplementary Notes, but are not limited to the following Supplementary Notes.

(Supplementary Note 1)

A state recognition apparatus comprising:

detection means for detecting that a mirror of a vehicle is operated;

determining means for determining a head position of a driver of the vehicle at a time point when the operation is performed; and setting means for setting the determined head position as a reference position of a head in the vehicle.

(Supplementary Note 2)

The state recognition apparatus according to supplementary note 1, wherein the detection means detects an action of operating the mirror from a first captured image including the mirror to detect that the mirror is operated.

(Supplementary Note 3)

The state recognition apparatus according to supplementary note 2, wherein the action of operating the mirror is an action of moving the mirror by hand or an action of operating an operation interface of the mirror.

(Supplementary Note 4)

The state recognition apparatus according to any one of supplementary notes 1 to 3, wherein the determining means acquires a second captured image including a head of the driver, and determines the head position of the driver based on coordinates of one or more points related to the head included in the second captured image.

(Supplementary Note 5)

The state recognition apparatus according to supplementary note 1, wherein the setting means outputs reference information including the determined head position.

(Supplementary Note 6)

The state recognition apparatus according to supplementary note 5, wherein the determining means determines the head position of the driver based on a combination of coordinates of each of a plurality of parts of the head, and wherein the setting means determines a posture of the head based on the combination of the coordinates, and outputs the reference information including the determined posture of the head.

(Supplementary Note 7)

The state recognition apparatus according to supplementary note 5 or 6, wherein the setting means determines identification information of the driver and outputs the reference information including the determined identification information.

(Supplementary Note 8)

The state recognition apparatus according to supplementary note 5, wherein the setting means performs:

outputting the reference information including the head position of the driver if the head position of the driver is determined within a predetermined period; and outputting the reference information including a predetermined head position if the head position of the driver is not determined within the predetermined period.

(Supplementary Note 9)

The state recognition apparatus according to supplementary note 8, wherein the predetermined head position is a head position included in the reference information output in the past.

(Supplementary Note 10)

A state recognition method executed by a computer, comprising:

a detection step of detecting that a mirror of a vehicle is operated;

a determining step of determining a head position of a driver of the vehicle at a time point when the operation is performed; and a setting step of setting the determined head position as a reference position of a head in the vehicle.

(Supplementary Note 11)

The state recognition method according to supplementary note 10, wherein the detection step detects an action of operating the mirror from a first captured image including the mirror to detect that the mirror is operated.

(Supplementary Note 12)

The state recognition method according to supplementary note 11, wherein the action of operating the mirror is an action of moving the mirror by hand or an action of operating an operation interface of the mirror.

(Supplementary Note 13)

The state recognition method according to any one of supplementary notes 10 to 12, wherein the determining step acquires a second captured image including a head of the driver and determines the head position of the driver based on coordinates of one or more points related to the head included in the second captured image.

(Supplementary Note 14)

The state recognition method according to supplementary note 10, wherein the setting step outputs reference information including the determined head position.

(Supplementary Note 15)

The state recognition method according to supplementary note 14, wherein the determining step determines the head position of the driver based on a combination of coordinates of each of a plurality of parts of the head, and wherein the setting step determines a posture of the head based on the combination of the coordinates, and outputs the reference information including the determined posture of the head.

(Supplementary Note 16)

The state recognition method according to supplementary note 14 or 15, wherein the setting step determines identification information of the driver, and outputs the reference information including the determined identification information.

(Supplementary Note 17)

The state recognition method according to supplementary note 14, wherein the setting step includes:

outputting the reference information including the head position of the driver if the head position of the driver is determined within a predetermined period; and outputting the reference information including a predetermined head position if the head position of the driver is not determined within the predetermined period.

(Supplementary Note 18)

The state recognition method according to supplementary note 17, wherein the predetermined head position is a head position included in the reference information output in the past.

(Supplementary Note 19)

A non-transitory computer-readable medium storing a program that causes a computer to execute:

a detection step of detecting that a mirror of a vehicle is operated;

a determining step of determining a head position of a driver of the vehicle at a time point when the operation is performed; and a setting step of setting the determined head position as a reference position of a head in the vehicle.

(Supplementary Note 20)

The computer-readable medium according to supplementary note 19, wherein the detection step detects an action of operating the mirror from a first captured image including the mirror to detect that the mirror is operated.

(Supplementary Note 21)

The computer-readable medium according to supplementary note 20, wherein the action of operating the mirror is an action of moving the mirror by hand or an action of operating an operation interface of the mirror.

(Supplementary Note 22)

The computer-readable medium according to any one of supplementary notes 19 to 21, wherein the determining step acquires a second captured image including a head of the driver and determines the head position of the driver based on coordinates of one or more points related to the head included in the second captured image.

(Supplementary Note 23)

The computer-readable medium according to supplementary note 19, wherein the setting step outputs reference information including the determined head position.

(Supplementary Note 24)

The computer-readable medium according to supplementary note 23, wherein the determining step determines the head position of the driver based on a combination of coordinates of each of a plurality of parts of the head, and wherein the setting step determines a posture of the head based on the combination of the coordinates, and outputs the reference information including the determined posture of the head is output.

(Supplementary Note 25)

The computer-readable medium according to supplementary note 23 or 24, wherein the setting step determines identification information of the driver, and outputs the reference information including the determined identification information.

(Supplementary Note 26)

The computer-readable medium according to supplementary note 23, wherein the setting step includes:

outputting the reference information including the head position of the driver if the head position of the driver is determined within a predetermined period; and outputting the reference information including a predetermined head position if the head position of the driver is not determined within the predetermined period.

(Supplementary Note 27)

The computer-readable medium according to supplementary note 26, wherein the predetermined head position is a head position included in the reference information output in the past.

(Supplementary Note 28)

A task execution system comprising:

a state recognition apparatus and an application apparatus, wherein the state recognition apparatus includes:

detection means for detecting that a mirror of a vehicle is operated;

determining means for determining a head position of a driver of the vehicle at a time point when the operation is performed; and setting means for outputting reference information including the determined head position, and wherein the application apparatus includes:

acquisition means for acquiring the reference information;

task execution means for executing a task by using the reference information; and output means for outputting output information regarding an execution result of the task.

(Supplementary Note 29)

The task execution system according to supplementary note 28, wherein the task execution means determines whether or not a deviation degree between a current head position of the driver and a head position included in the reference information satisfies a predetermined condition, and wherein the output means generates the output information notifying that a state of the driver is abnormal, when the deviation degree satisfies the predetermined condition.

(Supplementary Note 30)

A task execution method comprising:

a state recognition apparatus performs:

a detection step of detecting that a mirror of a vehicle is operated;

a determining step of determining a head position of a driver of the vehicle at a time point when the operation is performed; and a setting step of outputting reference information including the determined head position; and an application apparatus performs:

an acquisition step of acquiring the reference information;

a task execution step of executing a task by using the reference information; and an output step of outputting output information regarding an execution result of the task.

(Supplementary Note 31)

The task execution method according to supplementary note 30, wherein the task execution step determines whether or not a deviation degree between a current head position of the driver and a head position included in the reference information satisfies a predetermined condition, and wherein the outputting step generates the output information notifying that a state of the driver is abnormal is generated if the deviation degree satisfies the predetermined condition.

REFERENCE SIGNS LIST

10 VEHICLE
20 MIRROR
30 DRIVER
40 HEAD POSITION
50 HEAD
51 RIGHT EYE
52 LEFT EYE
53 NOSE
54 RIGHT EAR
55 LEFT EAR
60 REFERENCE INFORMATION
1000 COMPUTER
1020 BUS
1040 PROCESSOR
1060 MEMORY
1080 STORAGE DEVICE
1100 INPUT/OUTPUT INTERFACE
1120 NETWORK INTERFACE
2000 STATE RECOGNITION APPARATUS
2020 DETECTION UNIT
2040 DETERMINING UNIT
2060 SETTING UNIT
3000 APPLICATION APPARATUS
3020 ACQUISITION UNIT
3040 TASK EXECUTION UNIT
3060 OUTPUT UNIT
4000 TASK EXECUTION SYSTEM

What is claimed is:

1. A state recognition apparatus comprising:

at least one memory that is configured to store instructions; and at least one processor that is configured to execute the instructions to:

detect that a mirror of a vehicle is operated;

determine a head position of a driver of the vehicle at a time point when the operation is performed; and set the determined head position as a reference position of a head in the vehicle, wherein the determining the head position includes determining the head position of the driver based on a combination of coordinates of each of a plurality of parts of the head, and wherein the setting of the reference position includes:

determining a posture of the head based on the combination of the coordinates; and outputting reference information including the determined head position and the determined posture of the head.

2. The state recognition apparatus according to claim 1, wherein the detection of the operation of the mirror includes detecting an action of operating the mirror from a first captured image including the mirror to detect that the mirror is operated.

3. The state recognition apparatus according to claim 2, wherein the action of operating the mirror is an action of moving the mirror by hand or an action of operating an operation interface of the mirror.

4. The state recognition apparatus according to claim 1, wherein the determination of the head position includes:

acquiring a second captured image including a head of the driver; and determining the head position of the driver based on coordinates of one or more points related to the head included in the second captured image.

5. The state recognition apparatus according to claim 1, wherein the setting of the reference position includes determining identification information of the driver and outputting the reference information including the determined identification information.

6. The state recognition apparatus according to claim 1, wherein the setting of the reference position includes:

outputting the reference information including the head position of the driver if the head position of the driver is determined within a predetermined period; and outputting the reference information including a predetermined head position if the head position of the driver is not determined within the predetermined period.

7. The state recognition apparatus according to claim 6, wherein the predetermined head position is a head position included in the reference information output in the past.

8. A state recognition method executed by a computer, comprising:

detecting that a mirror of a vehicle is operated;

determining a head position of a driver of the vehicle at a time point when the operation is performed; and setting the determined head position as a reference position of a head in the vehicle, wherein the determining the head position includes determining the head position of the driver based on a combination of coordinates of each of a plurality of parts of the head, and wherein the setting of the reference position includes:

determining a posture of the head based on the combination of the coordinates; and outputting reference information including the determined head position and the determined posture of the head.

9. The state recognition method according to claim 8, wherein the detection of the operation of the mirror includes detecting an action of operating the mirror from a first captured image including the mirror to detect that the mirror is operated.

10. The state recognition method according to claim 9, wherein the action of operating the mirror is an action of moving the mirror by hand or an action of operating an operation interface of the mirror.

11. The state recognition method according to claim 8, wherein the determination of the head position includes:

acquiring a second captured image including a head of the driver; and determining the head position of the driver based on coordinates of one or more points related to the head included in the second captured image.

12. A non-transitory computer-readable medium storing a program that causes a computer to execute:

detecting that a mirror of a vehicle is operated;

determining a head position of a driver of the vehicle at a time point when the operation is performed; and setting the determined head position as a reference position of a head in the vehicle, wherein the determining the head position includes determining the head position of the driver based on a combination of coordinates of each of a plurality of parts of the head, and wherein the setting of the reference position includes:

determining a posture of the head based on the combination of the coordinates; and outputting reference information including the determined head position and the determined posture of the head.

13. The computer-readable medium according to claim 12, wherein the detection of the operation of the mirror includes detecting an action of operating the mirror from a first captured image including the mirror to detect that the mirror is operated.

14. The computer-readable medium according to claim 13, wherein the action of operating the mirror is an action of moving the mirror by hand or an action of operating an operation interface of the mirror.

15. The computer-readable medium according to claim 12, wherein the determination of the head position includes:

acquiring a second captured image including a head of the driver; and determining the head position of the driver based on coordinates of one or more points related to the head included in the second captured image.

* * * * *